United States Patent Office 3,733,292
Patented May 15, 1973

3,733,292
HYDROLYSIS OF MALEIC ANHYDRIDE COPOLYMERS
Julius Sirota, South Plainfield, and Irwin J. Davis, Somerville, N.J., assignors to National Starch and Chemical Corporation, New York, N.Y.
No Drawing. Continuation-in-part of application Ser. No. 728,758, May 13, 1968. This application Nov. 18, 1971, Ser. No. 200,241
Int. Cl. C08f 27/14, 39/00, 37/14
U.S. Cl. 260—29.6 H                                        7 Claims

ABSTRACT OF THE DISCLOSURE

Pressure sensitive adhesive composition and substrates coated therewith, said pressure sensitive adhesive compositions comprising lacquers of maleic anhydride containing copolymers wherein at least part of the maleic anhydride moieties have been hydrolyzed to the acid state. A method for effecting said hydrolysis which involves the use of a mixture of water and a water miscible organic solvent as the hydrolyzing reagent is described, said method enabling the production of novel hydrolyzed maleic anhydride copolymers.

---

This application is a continuation-in-part of application Ser. No. 728,758, filed May 13, 1968 and now abandoned.

As is known in the art, pressure sensitive adhesives comprise a class of adhesive compositions which may be formulated from a variety of materials such as gums and resins of both natural and synthetic derivation. When coated on a suitable substrate, these adhesive compositions share the common characteristic of being aggressively and permanently tacky at room temperature and are thus able to adhere to surfaces by the application of nothing more than manual pressure. Adhesives of this type may be applied to various substrates such as paper, cloth and plastic films and the resulting coated substrates may then be converted into tapes and labels which are especially useful in the packaging field for any number of applications involving marking, sealing, reinforcing and bonding.

In order to be satisfactory in commercial usage, a pressure sensitive adhesive must, of course, possess good tack and tack retention properties; that is, the adhesive must firmly adhere to various surfaces and the adhesive film thereof should continue to toughen on aging. Equally significant in many applications is the property of high internal strength, i.e. good cohesion. Thus, high internal or cohesive strength is a necessary characteristic of any adhesive composition which is to be employed in preparing adhesive products which must support considerable amounts of weight. It is also necessary that the property of high internal strength be instilled in a pressure sensitive adhesive without adversely affecting its tack and tack retention properties. Previously, internal strength had been imparted to the synthetic, i.e. vinyl, polymers employed as pressure sensitive arhesives by blending the latter with high molecular weight polymers. The latter method has, however, generally proved unsatisfactory since cohesive strength was attained only at the expense of sacrificing the tack and adhesion properties of the composition.

In order to overcome the aforementioned difficulties, small amounts of maleic anhydride have been incorporated, via polymerization, into such copolymers. Although the presence of the anhydride moiety in the copolymer base has served to provide the resulting pressure sensitive adhesive compositions with improved adhesive properties, its presence has, simultaneously, restricted the functionality of the resulting adhesive products. Thus, for example, such maleic anhydride-containing adhesives have not exhibited the cohesiveness, plasticity characteristics and general performance required for many end-use applications. The latter deficiencies are especially critical in adhesive tape products which may be subjected to flexing and general abuse and therefore require the adhesive films utilized therein to exhibit excellent internal strength and resistance to rupture.

Furthermore, the maleic anhydride copolymers offer no reactive sites for reaction with crosslinking agents; the latter cross-linking agents often being reacted with polymeric adhesive bases in order to greatly improve the cohesiveness, heat resistance, adhesion, toughness and plasticity thereof. This inability to react with cross-linking agents severely limits the performance characteritics of adhesive compositions derived from the maleic anhydride-containing polymeric bases and, correspondingly, the end-uses in which they may be employed.

In addition, the anhydride moieties in these adhesives bases are susceptible to attack by moisture and heat. Thus, on being exposed to moisture and/or heat in ordinary usage or to the excessive moisture and varying temperature conditions encountered during outdoor exposure, the ring structure of the maleic anhydride moiety in the polymer chain undergoes uncontrolled opening to the acid form. The uncontrolled nature of this reaction results in the formation of unstable adhesive films which are apt to show varying film properties depending upon the environmental conditions to which they may be subjected. This fluctuation also prevents the practitioner from accurately predicting the performance characteristics of a pressure sensitive adhesive and, thereby, greatly increases the opportunity for error in selecting an adhesive for a specific end-use application.

It is the object of this invention to prepare, by means of a novel hydrolysis procedure, lacquers of modified maleic anhydride containing copolymers for use in pressure sensitive adhesives which display excellent properties of tack, tack retention, adhesive strength, plasticity and film stability regardless of external environmental conditions. Another object of this invention is to prepare novel modified maleic anhydride containing copolymers which exhibit greatly increased reactivity, especially toward crosslinking agents. A further object of this invention is the use of these adhesives to prepare pressure sensitive tapes and labels. Various other objects and advantages of this invention will be apparent from the following description.

We have now found that the above described difficulties resulting from the use of maleic anhydride containing copolymers may be alleviated by subjecting the anhydride moieties present in said copolymers to a controlled hydrolysis procedure. The latter hydrolysis reaction may be depicted by the following equation:

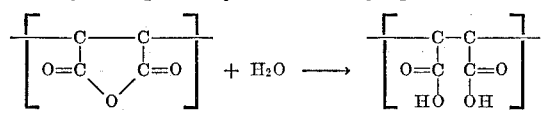

Thus, the controlled opening of the ring of the anhydride moiety of the copolymer yields a product which exhibits excellent adhesive, cohesive and plasticity properties regardless of heat and humidity considerations, thereby eliminating the problems encountered with conventional, unmodified maleic anhydride containing copolymers. Furthermore, the resulting hydrolyzed copolymers now exhibit reactive sites, i.e. the pendant carboxyl groups, which will enable them to react with crosslinking agents and thereby acquire the properties which are generally derived from such crosslinking reactions.

It is essential to note that the introduction of the acidic groups into the copolymers contemplated herein can be accomplished neither by utilizing acid as a comonomer in the polymerization reaction nor by directly reacting the maleic anhydride-containing copolymer with water. The polymerization approach is ineffective in view of the poor solubility characteristics and essential non-reactivity of the maleic acid. Products resulting from such polymerizations exhibit poor monomer conversion, low molecular weights and phasing, thereby making them totally impractical for end-use application.

Where maleic anhydried comprises the larger portion of the maleic anhydride copolymer or where the copolymerizing comonomer is hydrophilic, refluxing of the copolymer with water (or with water under alkaline conditions) may be somewhat effective. The alkaline hydrolysis, of course, will form the salt of the maleic acid moieties and the end product will not contain the free acid groups as desired in our invention. However, attempts to hydrolyze the anhydride moieties by adding water diretcly to lacquers of maleic anhydride copolymers contemplated herein (i.e. containing a relatievly small amount of maleic anhydride and which do not contain a hydrophilic comonomer), and thereafter refluxing the mixture have proved to be entirely ineffective. The inherently hydrophobic organic solvent present in the lacquer as well as the low maleic anhydride content and hydrophobic nature of the copolymer appear to shield the anhydride moieties from the attack of the water.

In order to effective satisfactory hydrolysis, we have discovered a procedure which involves introducing the water into the polymer lacquer system in the form of a solution with a "mutual solvent," i.e. a water miscible organic solvent. It thus appears that the presence of the mutual solvent enables the water to penetrate the hydrophobic solvent barrier and thereby to react with the anhydride moieties.

It is to be understood that for purposes of this invention, the novel process herein involves the hydrolysis of maleic anhydride-containing polymers which are dissolved in organic solvent, which solutions are commonly termed "lacquers" or "copolymer lacquers."

Also for purposes of this invention, when reference is made to the term "maleic anhydride-containing polymer," it is meant to denote a copolymer containing from about 1 to 25% of maleic anhydride moieties, as based on the total weight of the copolymer; said copolymer containing one or more additional comonomer moieties such that the resulting copolymer has a Williams plasticity value ranging from about 1.50 to 5.50.

Plasticity may be defined as the property of a polymeric material which enables it to be deformed permanently and continuously without rupture upon the application of a force thereto. This property is measured by the use of a Williams' Plastometer which is manufactured by Scott Testers, Inc. and is designed to conform to the standards set by ASTM Method D-926.

In determining Williams plasticity values, a film, having a 2–3 mil dry thickness, of the copolymer being evaluated is cast onto a conventional release sheet. The dry film is peeled from the release sheet and molded into a solid cylindrical slug approximately 9/16 inches wide and 2 centimeters long and weighing exactly 1.8 grams. The slug is then conditioned for 15 minutes at a temperature of 100° F. whereupon it is inserted between the two parallel platens of the plastometer which have also been maintained at a temperature of 100° F. The upper platen, which is weighted with 5 kilograms and is attached to a micrometer which serves to measure the height of the slug after compression, is lowered onto the slug and maintained in that position for 15 minutes. The resulting micrometer readings, in millimeters, indicate the resistance to plastic flow on the part of the polymer samples being evaluated. High plasticity values are indicative of greater resistance to flow and, thus, denote a firmer polymer whereas low plasticity values are indicative of less resistance to flow and denote a softer polymer.

With regard to the comonomers which may be copolymerized with the maleic anhydride, these may include: alkyl esters of acrylic and methacrylic acids containing a maximum of about 12 carbon atoms in the ester group, such as ethyl acrylate, butyl acrylate, octyl acrylate and ethyl methacrylate; vinyl esters such as vinyl acetate; vinyl halides such as vinyl chloride; vinylidene halides such as vinylidene chloride; acrylonitrile; and, vinyl ethers such as vinyl methyl, ethyl and isobutyl ether.

Typical maleic anhydride containing copolymers and methods for their preparation are fully described in U.S. Patent No. 3,371,071, which issued on Feb. 27, 1968, as well as in U.S. Pat. No. 3,257,478 which issued on June 21, 1966; the latter patents being assigned to the assignee of the present application. Thus, in general, applicable copolymers may be prepared by heating a mixture containing the required proportions of the selected monomers, including maleic anhydride, together with the selected solvent, e.g. methylene chloride, toluene, cyclohexane, ethyl acetate and ethyl formate, in the presence of a solvent soluble, free radical initiator such as azobisisobutyronitrile or benzoyl peroxide. The heating of the latter monomer solution proceeds for a period of about 1 to 2 hours at the reflux temperature of the system, whereupon additional solvent is usually added so that the polymer resin solids content of the copolymer lacquer may be maintained within the desired range of about 25 to 45%, by weight. Polymerization is then completed by heating the reaction mixture for an additional 5 to 8 hours at its reflux temperature.

The resulting maleic anhydride containing copolymer lacquers are usually clear with a characteristic slight yellow cast. Their final polymer solids content usually ranges from about 25 to 45%, by weight, and their intrinsic viscosity, as determined in acetone at 30° C., preferably exceeds about 1.00. As previously noted, the Williams plasticity values of the resulting copolymers should preferably be within the range of from about 1.50 to 5.50 so as to avoid, in one case, the lack of cohesion and reduced holding power evident in the softer copolymers having plasticity values below about 1.50 while, on the other hand, avoiding the poor tack and adhesion evident in the harder copolymers having plasticity values above about 5.50.

The hydrolysis procedure may be accomplished by merely admixing the copolymer lacquer with the water-mutual solvent mixture and allowing the reaction to proceed at a temperature ranging from room temperature to the reflux temperature of the system. Needles to say, the rate of the hydrolysis reaction is greatly increased at the higher temperatures. The rate of reaction is also increased by utilizing copolymer lacquers containing high solids content, e.g. 55%, by weight, total solids in the hydrolysis reaction. The latter high solids condition may be readily obtained by hydrolyzing the copolymer lacquer subsequent to the polymerization reaction but prior to the point where the lacquer is diluted to the required solids content.

Among the applicable mutual solvents are included: methanol, ethanol, n-propanol, isopropanol, acetone, 1,4-dioxane, diacetone alcohol, methyl ethyl ketone and glycol ethers. The key characteristic of these organic solvents is that they are also capable of dissolving at least about 10% of water, based on their own weight. More than one of these mutual solvents may be simultaneously present during the hydrolysis reaction.

In order to be applicable as a polymeric base for the pressure sensitive adhesives of this invention, the maleic anhydride containing polymers should be hydrolyzed to the extent that at least about 15% of their anhydride moieties be opened to the diacid form, and preferably at least about 50% of such moieties. Copolymers which exhibit a degree of hydrolysis which is less than about 15%, are still subject to the unpredictable performance characteristics of the anhydride-containing copolymer.

With regard to the relative proportions of mutual solvent and water utilized in the hydrolysis procedure, these concentrations are primarily dependent upon the degree of hyrolysis desired in the final product as well as on the solubility relationship between the mutual solvent and water. Thus, for example, the concentration of mutual solvent will typically range from about 10 to 75 parts, by weight, per each 100 parts of dry polymer, while the water will be typically present in at least stoichiometric amounts with regard to the anhydride moieties present in the polymer and, preferably, in a concentration which exceeds the stoichiometric quantity. It should be noted that the latter stoichiometric relationships are based on the degree of hydrolysis desired in the final product, e.g. where a 70% degree of hydrolysis is desired, the stoichiometric equivalencies are calculated on the basis of only 70% of the available anhydride moieties in the polymer. Furthermore, although it is preferable to use an excess amount of water in the reaction system, this excess should not be extended to the point where the polymers starts to precipitate from the system or an aqueous layer is formed in the system.

As previously noted, the resulting hydrolyzed copolymers are exceptionally reactive with crosslinking agents which serve to improve the performance characteristics of the resulting adhesive compositions. Included among such crosslinking agents are butylated melamine resins, monomeric methoxymethyl melamine compounds, urea formaldehyde resins and one step phenolic resins; the latter usually being present in a concentration ranging from about 0.25 to 2.0 parts, by weight, per each 100 parts of dry polymer. The crosslinking phenomenon is achieved by means of the reaction with the pendant carboxyl groups on the copolymer, and thus, necessarily, can not be accomplished with the unhydrolyzed copolymer.

Various other additives may be incorporated in the novel adhesive products of our invention in order to modify the properties thereof. Among these additives may be included: tackifiers, such as hydrogenated methyl esters of rosin, diethylene glycol esters of rosin, and rosin derived alkyd resins; fillers and pigments, such as talc, titanium dioxide and calcium carbonate; and, antioxidants.

In using the lacquers containing the novel polymeric adhesive bases of our invention for the preparation of tapes and labels, they may be applied to substrates by means of any coating technique whose use is desired by the practitioner. Thus, these modified copolymer lacquers may be sprayed onto a substrate or they may be applied by the use of any mechanical coating process such as air knife, trailing blade, reverse roll, or gravure coating techniques. In addition, the adhesive lacquer may be applied by the transfer of its free film onto the preferred substrate. Inasmuch as the cast films derived from our novel adhesive blends are usually exceedingly tacky, they are applied at coating weights which yield a dry film thickness in the range of about 0.5 to 3.0 mils. The coating weights at which these adhesives are applied will, of course, vary according to the particular copolymer, the selected substrate and the specific end-use application of the resulting coated product.

Our adhesive compositions may be coated onto a virtually unlimited variety of substrates, including paper, cloth, paperboard, metal sheets ond foils, fiber glass, foamed plastics, rubber, cellophane, wood, and plastic films and sheets, such as those derived from polyethylene terephthalate, polystyrene, rubber hydrochloride, polyethylene, polypropylene, polyvinyl chloride and polyvinylidene chloride. Moreover, these novel adhesive products may be used for the bonding and lamination of any of the above listed substrates.

After air drying, the resulting solvent free adhesive films exhibit superior pressure sensitive properties. In order to demonstrate the extraordinary characteristics of tack, tack retention and cohesion of the novel pressure sensitive alhesive products of this invention, the following testing procedures may be employed.

20° "HOLD" TEST

This test measures a combination of adhesive and cohesive properties. In conducting this test, films of the adhesives being evaluated are applied to a polyethylene terephthalate film backing in a 1 mil dry thickness. The test samples, which are ½ inch in width and 3 inches in length, are securely adhered by thumb pressure to the top of a ½ inch chrome-steel bar tilted 20° from the vertical; the dimensions of the adhered area being ½ inch by ½ inch. After a 15 minute "wetting out" period, the portion of the sample that extends downward is folded back approximately 2½ inches and a 200 grams weight is secured to its lower extremity. The time required for the sample to fail, that is, for the film to separate or delaminate from the bar, is recorded as the 20° hold time. A 20° hold time of 24 hours is generally considered, by those skilled in the art, to be sufficient to classify and adhesive as "superior." All the samples that were tested and which passed the 24 hour mark were removed from the bar and assigned a 20° hold value of "24+" hours.

180° "HOLD" TEST

This test is identical to the 20° "Hold" test, as described above, except that the chrome-steel bar is in a position in which the specimen makes a 180° angle with the vertical and the dimensions of the adhered area of the sample are one inch by one inch. Thereafter, a 1000 gram weight is secured to the sample and the time required for the film to separate or delaminate from the bar is recorded as the 180° hold time. Since a 180° hold time of 24 hours is generally considered, by those skilled in the art, to be sufficient to classify an adhesive as "superior," all of the samples that were tested and which passed the 24 hour mark were removed from the bar and assigned a 180° hold value of "24+" hours.

180° PEEL ADHESION TEST

This standard adhesion test, as described in ASTM D–1000, serves to measure the internal strength of the adhesive compositions of this invention. The samples are prepared in the manner described in the 20° "Hold" Test, above. The test consists of measuring the force necessary to strip or delaminate the adhesive test sample at a 180° angle from a stainless steel panel at a rate of pull of 12 inches per minute. An Instron Tensile Tester is used to provide the pulling force. Thus, the force necessary to effect delamination is recorded as the 180° peel force.

In the following examples, which further illustrate the embodiment of our invention, all parts are given by weight unless otherwise noted.

Example I

This example illustrates the preparation of one of the novel adhesive products of this invention as well as the unique hydrolysis procedure utilized therein.

A reaction vessel fitted with a thermometer, stirrer and condenser was charged with the following ingredients:

| | Parts |
|---|---|
| Vinyl acetate | 20 |
| Ethyl acrylate | 10 |
| 2-ethyl hexyl acrylate | 70 |
| Maleic anhydride | 5 |
| Methylene chloride | 40 |
| Ethyl acetate | 35 |
| Azobisisobutyronitrile | 0.06 |

The mixture was heated, while under agitation, until reflux was attained at a temperature of 70–74° C. Heating was continued at the reflux temperature for 2 hours whereupon 3.0 parts of toluene and an additional 0.14 part of azobisisobutyronitrile were added. The polymerization mixture was then further refluxed for a period of 5 hours. The preparation of the maleic anhydride containing copolymer lacquer was completed by the further steps of adding 57 parts of toluene and 15 parts of ethyl acetate, refluxing for an additional 30 minutes, and cooling.

The resulting copolymer lacquer was clear with a slight yellow cast. The total amount of copolymer resin solids in the lacquer was 38%, by weight. The intrinsic viscosity, as measured in acetone at 30° C., was 1.12, while its Williams plasticity value was 2.40.

Thereafter, 100 parts of the above prepared lacquer, 10 parts of a 91%, by weight, aqueous isopropanol solution and 1 part of water were thoroughly admixed and allowed to react at room temperature. The degree of hydrolysis was periodically determined by means of infrared analysis of the polymeric product. At the conclusion of a 3-day period, the product was observed to be 45% hydrolyzed, while it was 100% hydrolyzed after a 10-day reaction period.

The above procedure was then repeated, under identical conditions, with the exception that ethanol and acetone were each, respectively, substituted for the isopropanol solvent. In each instance, the resulting hydrolyzed products were comparable to the product prepared hereinabove.

Example II

This example illustrates the use of a heated hydrolysis procedure in the preparation of the adhesive products of this invention.

Thus, the monomeric recipe specified in Example I was polymerized by means of the general procedure set forth therein. However, prior to the dilution of the polymeric product, 80.5 parts of a 91%, by weight, aqueous isopropanol solution were added to the hot polymer lacquer and the resulting mixture allowed to react as the reflux temperature of the system for an additional six hours. Upon being cooled, analysis of the resulting polymeric product revealed that it had been 95% converted to the acid form.

Example III

This example illustrates the excellent adhesive properties exhibited by the novel products of this invention as compared with the unhydrolyzed version thereof.

Thus, the 100% hydrolyzed polymeric product prepared in Example I as well as the unhydrolyzed version thereof were evaluated by means of the above described 20° "Hold," 180° "Hold" and 180° Peel Adhesion Tests. The results of these evaluations are presented in the following table.

| Adhesive sample | 20° hold (hours) | 180° hold (hours) | 180° peel adhesion (oz./in.) |
|---|---|---|---|
| Hydrolyzed polymer | +24 | +24 | 54.4 |
| Unhydrolyzed polymer | 3½ | 5¾ | 44.8 |

The results summarized above clearly show the increased adhesive and cohesive strength exhibited by the hydrolyzed copolymers of this invention.

Example IV

This example illustrates the necessity for utilizing the novel hydrolysis procedure of this invention in order to introduce the desirable maleic acid groups into the copolymer.

The polymerization procedure set forth in Example I was repeated, under identical conditions, with the exception that maleic acid was substituted for the maleic anhydride. Poor conversion, phasing and a low I.V. of 0.05, as determined in acetone at 30° C., were clearly indicative of the failure of this approach to introduce maleic acid moieties into the copolymer.

Furthermore, stoichiometric amounts of water were added to each of two samples of the maleic anhydride containing copolymer prepared in Example I. The first sample was allowed to react at room temperature for a period of 30 days, while the second was heated at the reflux temperature of the system for a period of 8 hours. In neither instance was any appreciable hydrolysis attained, i.e. less than 5% hydrolysis, thereby indicating the inability of this direct hydrolysis procedure to introduce maleic acid moieties into the polymerc structure.

Example V

This example illustrates the excellent reactivity toward crosslinking agents of the hydrolyzed polymers of this invention as compared with the reactivity of unhydrolyzed polymers.

Thus, 100 parts of each of the hydrolyzed and unhydrolyzed products prepared in Example I were admixed with 10 parts of a low molecular weight polyvinyl ether plasticizer and then reacted with 0.3 part of a butylated melamine crosslinking agent. The properties of the resulting products as well as of the non-crosslinked hydrolyzed polymers were then evaluated by means of the following test procedures:

20° Hold Test—as described hereinabove.
Williams' plasticity—as described hereinabove.
Heat resistance—This procedure is identical to the 180° "Hold" test, as described above, with the exception that the system is maintained at a temperature of 200° F.

The following results were obtained:

| Adhesive sample | 20° hold (hours) | Plasticity | Heat resistance (hours) |
|---|---|---|---|
| Crosslinked hydrolyzed polymer | +24 | 3.4 | 6 |
| Non-crosslinked hydrolyzed polymer | +24 | 2.5 | 1½ |
| Crosslinked unhydrolyzed polymer | 3 | 2.2 | 1½ |

The results summarized above indicate the excellent reactivity of the hydrolyzed polymers of this invention. Furthermore, since the properties of the unhydrolyzed polymer which has been subjected to the crosslinking reaction closely approximate those of the unhydrolyzed copolymer, it is obvious that the unhydrolyzed copolymer has been almost totally unreceptive to the crosslinking reaction.

Summarizing, it is thus seen that this invention provides a novel hydrolysis procedure which may be ideally used to hydrolyze malec anhydride containing copolymers and thereby upgrade the properties of the pressure sensitive adhesives derived therefrom.

Variations may be made in proportions, procedures and materials without departing from the scope of this invention, which is defined by the following claims.

We claim:

1. A method for treating pressure sensitive adhesive lacquers in order to improve their properties of adhesion, cohesion and stability, comprising the step of takng a pressure sensitive adhesive lacquer consisting essentially of as its adhesive component a hydrophobic copolymer of maleic anhydride with at least one comonomer selected from the class consisting of the alkyl esters of acrylic and methacrylic acids containing a maximum of 12 carbon atoms in the alkyl group, vinyl esters, vinyl ethers, vinyl halides, vinylidene halides and acrylonitrile, the proportion of maleic anhydride in said copolymerr being from 1% to 25% based on the weight of the copolymer, in a hydrophobic organic solvent, and admixing with said lacquer a mixture of water and a water-miscible organic solvent selected from the group consisting of methanol, ethanol, n-propanol, isopropanol, acetone, 1-4-dioxane, methyl ethyl ketone, diacetone alcohol and glycol ethers, said water-miscible organic solvent being one which is capable of dissolving at least 10% of its own weight of water, the amount of water thus added to the maleic anhydride copolymer being sufficient to hydrolyze at least 15% to 100% of the maleic anhydride moieties to their acid form.

2. The method of claim 1 wherein said copolymer has a Williams' plasticity value of from about 1.5 to 5.50.

3. The method of claim 1, wherein said organic solvent is present in a concentration of from about 10 to 75 parts, by weight, per each 100 parts of dry copolymer and said water is present in at least stoichiometric amounts with regard to the available anhydride moieties in said copolymer.

4. The product of the method of clam 1.

5. The product of the method of claim 2.

6. The product of the method of claim 3.

7. The product of the method of claim 1, wherein said maleic acid containing pressure sensitive adhesive copolymer has been crosslinked via its pendant carboxyl groups.

References Cited

UNITED STATES PATENTS

| | | |
|---|---|---|
| 2,838,421 | 6/1958 | Sohl. |
| 3,245,933 | 4/1966 | Muskat. |
| 3,475,515 | 10/1969 | Blatz. |

FOREIGN PATENTS

| | | |
|---|---|---|
| 6,660,584 | 7/1966 | Netherlands. |

MELVIN GOLDSTEIN, Primary Examiner

U.S. Cl. X.R.

117—122 P, PA, PF; 260—29.6 E